United States Patent

Uozumi

[15] 3,641,845
[45] Feb. 15, 1972

[54] OIL PRESSURE CONTROL DEVICE FOR FLUID-TYPE AUTOMATIC TRANSMISSION

[72] Inventor: Sumio Uozumi, Toyota-shi, Japan
[73] Assignee: Toyota Jidosha Kogyo Kabushiki Kaisha, Toyota-shi, Japan
[22] Filed: July 22, 1969
[21] Appl. No.: 843,509

[30] Foreign Application Priority Data
July 23, 1968  Japan.....................43/51630

[52] U.S. Cl..............................................74/867
[51] Int. Cl..........................................B60k 21/00
[58] Field of Search..................74/864, 865, 867–869

[56] References Cited

UNITED STATES PATENTS

| | | | |
|---|---|---|---|
| 3,393,585 | 7/1968 | Pierce, Jr.................. | 74/869 X |
| 3,424,037 | 1/1969 | Searles...................... | 74/869 |
| 3,438,285 | 4/1969 | Hanzi et al................ | 74/869 |
| 3,446,098 | 5/1969 | Searles...................... | 74/869 |

*Primary Examiner*—Arthur T. McKeon
*Attorney*—Harry G. Shapiro

[57] ABSTRACT

The present invention provides an oil pressure control device for an automatic transmission of vehicles, in which an oil pressure proportional to the opening of the throttle is applied through the aid of springs to the pressure control valve for controlling the pressure acting on the servosystems. The oil pressure is increased to a prescribed level in proportion to the throttle opening, but once at that level, the oil pressure is maintained constant regardless of any additional increment of the throttle opening, so as to improve the operation and efficiency of the transmission without changing the throttle pressure Pth.

4 Claims, 3 Drawing Figures

INVENTOR.
SUMIO UOZUMI
BY
Harry G. Shapiro

OIL PRESSURE CONTROL DEVICE FOR FLUID-TYPE AUTOMATIC TRANSMISSION

This invention relates to an oil pressure control device for a fluid-type automatic transmission system used for vehicles such as automobiles.

In conventional control systems for automatic transmissions, the capacity of the servos which actuate the various brakes and clutches is often inadequate at about one-half the maximum throttle setting. This is because the systems have been designed to minimize the gearshift shock in the automatic transmissions when the servos are actuated at full throttle settings.

The present invention solves the above problem without changing the throttle pressure Pth, i.e., without changing the automatic gearshift point characteristics of the transmission, by using a specific oil control circuit.

The present invention is applied to a fluid-type automatic transmission system having a hydraulic torque converter and a transmission controlled by hydraulic servosystems. According to this invention, transmission performance is improved by controlling the oil pressure acting on said servosystems so that the input shaft torque required in accordance with the braking torque is made approximately equal to the rotational torque on the output side of the torque converter relative to the amount of engine throttle valve opening.

In accordance with this invention, oil pressure proportional to the amount of throttle opening is applied through a spring to a pressure control valve which controls the oil pressure acting on the hydraulic servosystems. When the throttle valve is opened wider than a certain prescribed position, the force produced as a result of the increase in the oil pressure is regulated by the pressure control valve and maintained at a fixed value, with the result that up to the above-mentioned throttle opening, the pressure from the pressure control valve increases with an increase in the amount of throttle opening, but when the throttle valve is opened wider than the above-mentioned opening, the pressure does not increase.

The present invention will be described more in detail referring to an illustrative embodiment thereof shown in the attached drawing, in which.

Figure 1:
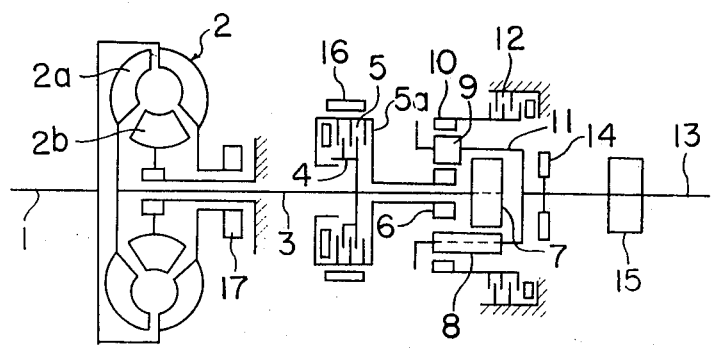
FIG. 1 shows an example of an automatic transmission system to which an oil pressure control device of the invention is applied.

The oil pressure control device of the invention is used for fluid-type automatic transmission systems having a torque converter consisting of a pump impeller, a turbine runner, and a stator wheel, and a gear transmission device of which the gear change or shift is controlled by the brake bands and clutches and so on. FIG. 1 shows, as an example, a fluid-type automatic transmission system which provides two speeds forward and one speed reverse.

Referring now to FIG. 1, the torque converter consists of pump impeller 2, turbine runner 2a and stator wheel 2b. The pump impeller 2 is directly coupled with the engine crankshaft 1. The engine power is transmitted through fluid, e.g., oil, from the pump impeller 2 to the turbine runner 2a and then guided by the stator 2b to reenter the pump impeller 2. Repeating this fluid circulation, the rotating torque is transmitted continuously to turbine shaft 3 connected to the turbine runner 2a. The construction of the speed change gear device located at the rear of the torque converter will now be described. The turbine shaft 3 functions as an input shaft to transmit the engine power to a planetary gear set. On the shaft 3 are fixedly installed a hub 4 of a clutch 5 and an input sun gear 7. To a clutch drum and disk 5a of the clutch 5 related with the hub 4 through a plurality of clutch plates, a low sun gear 6 is fitted so as to form a unitary structure. Pinions 8 and 9 are held by a carrier 11 which is integral with the output shaft 13. The pinion 8 is meshed with the input sun gear 7 and the pinion 9, while the pinion 9 is meshed with the low sun gear 6, a ring gear 10 and the pinion 8. On the clutch drum 5a of the clutch 5 is provided a front brake band 16 for the control of clutch drum rotation. Between the drum of the ring gear 10 and the transmission case is located a rear brake 12. As shown in FIG. 1, a rear oil pump 14, a governor 15 and a front oil pump 17 are further provided.

The detailed explanation of this two-speed transmission is as follows:

First Speed

When the front brake band 16 is applied, the low sun gear 6 which is integral with the drum of the clutch 5 is prevented from rotation and the speed of revolution from the input shaft 3 is reduced and transmitted to the output shaft 13, thus providing the first speed.

Second Speed

When the clutch 5 is operated so as to make the planetary gear set act in unison there is formed a direct drive connection between the input shaft 3 and the output shaft 13.

Reverse

The rear brake 12 is applied to prevent the ring gear 10 from turning. Thus the power from the input shaft 3 is reversed and reduced and transmitted to the output shaft 13.

As stated above, the turbine shaft rotational torque is transmitted to the speed change gear device located behind the torque converter, and by automatically controlling the clutch 5, and the brakes 12 and 16 by means of the required servo oil pressure, an effective transmission of two forward speeds and one reverse speed is obtained with the aid of the planetary gears.

Figure 2:
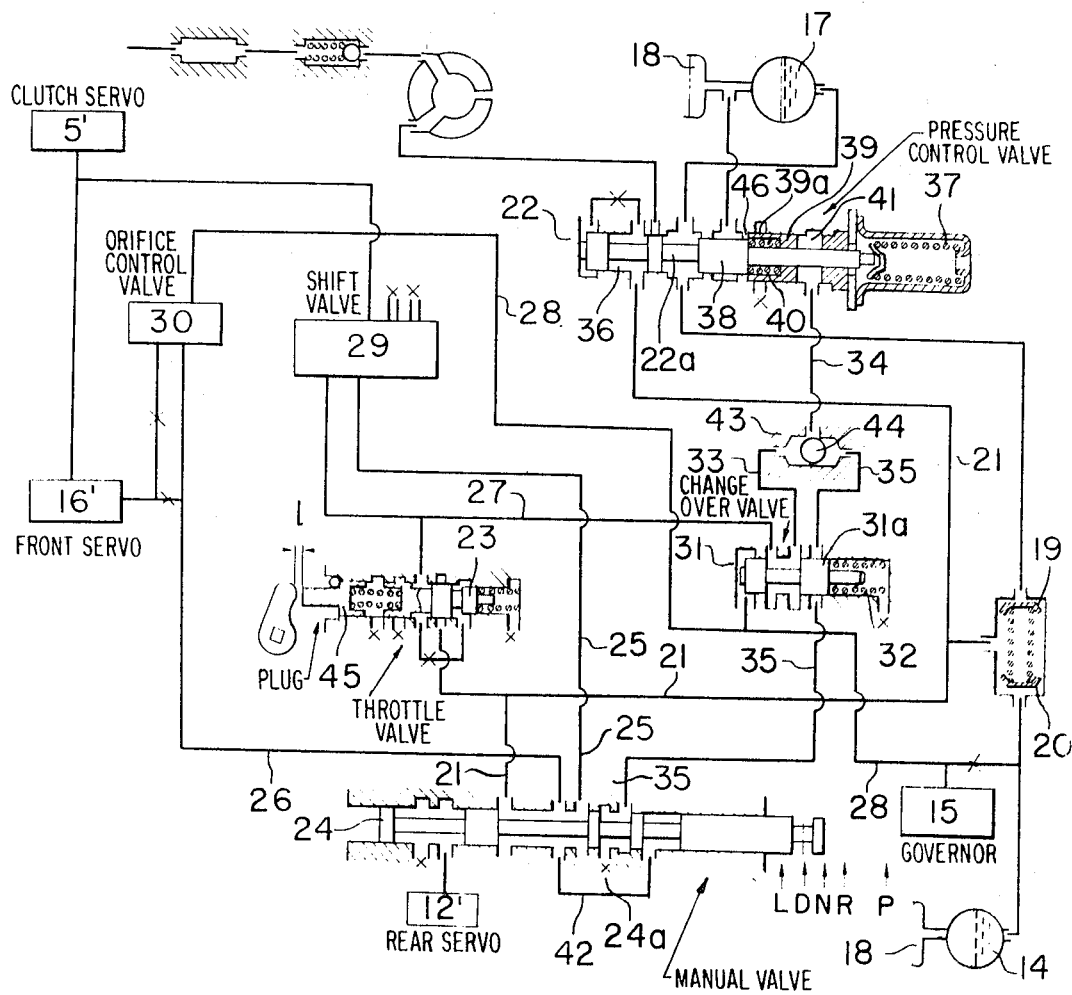
FIG. 2 shows a circuit including the oil pressure control device of the present invention.

The present invention is concerned with the hydraulic control circuit for controlling the servo oil pressure acting on the clutch 5 and the brakes 12 and 16, the details of which, with reference to one preferred embodiment, are described as follows:

FIG. 2 illustrates a hydraulic circuit diagram for practicing the present invention and shows the drive range (D-position range of a manual valve 24 to be described later). In FIG. 2, the oil is drawn up from the oil reservoir 18 by means of the front oil pump 17, driven directly by the engine crankshaft 1, and the rear oil pump 14, driven by the output shaft 13. The oil thus drawn up flows through check valves 19 and 20, to a line pressure circuit 21. The oil pressure in this circuit 21 is controlled by a pressure control valve 22 and supplied to a throttle valve 23 also. When a manual valve 24 is in D position (drive range), the oil is also fed to lines 25 and 26. The engine throttle valve opening (throttle opening) is sensed in the form of the displacement of a plug 45. In a line 27, there is built up an oil pressure (throttle pressure Pth) proportional to this displacement of the plug 45, i.e., the throttle opening, by means of the throttle valve 23. On the other hand, an oil pressure proportional to the vehicle speed is provided by governor 15 which is driven by the output shaft 13, and is supplied as the governor pressure Pgo to a line 28. The switching of the gear ratio of the planetary gear set is made by means of a shift valve 29 which is moved by the aforementioned throttle pressure Pth and the governor pressure Pgo. An orifice control valve 30 is provided to relieve the shock at the time of changing the gear ratio. In FIG. 2, 5' designates the servo for the clutch 5, 16' the servo for the front brake band 16, and 12' is the servo for the rear brake 12.

The changeover valve 31 is so designed that the governor pressure Pgo produced in the oil pressure circuit 28 in accordance with the vehicle speed is carried to the left-hand end surface of the valve member 31a. At the right-hand end surface of the valve member 31a is provided a coil spring 32. The movement of valve member 31a is controlled by the combination of the governor pressure Pgo and the force of the coil spring 32. However, since the force of this coil spring 32 has been set to a prescribed value, the changeover valve 31 is operated in accordance with the variation of the governor pressure Pgo. That is, when the output shaft 13 is turning at a low speed and the governor pressure Pgo is low, the valve member 31a of the changeover valve 31 is moved leftward by the force of the coil spring 32, connecting the circuits 27 and 33 to furnish the throttle pressure Pth from the circuit 27 to the pressure control valve 22 via the circuits 33 and 34. As the output shaft 13 reaches high speed and the governor pressure Pgo increases, the governor pressure Pgo overcomes the force of the coil spring 32 to move the valve member 31a to the right to block the connection between circuits 27 and 33. In this position, the circuits 33 and 35 are interconnected and the oil pressure in the circuit 34 is discharged to the passage 24a of the manual valve 24 after passing through the circuits 33 and 35.

The pressure control valve 22, which is one of the important parts of the present invention, functions to furnish the line pressure $pl$ which will be described later, to the clutch 5 and the brakes 12 and 16. The oil from the oil pumps 17 and 14 is carried via the circuit 21 to the left-hand chamber 36 of the valve 22. On the other hand, at the right-hand end of the valve 22 is provided the coil spring 37; and further to the left of the spring, at the land 38 of valve member 22a, are installed a sleeve 39 and a coil spring 40. The right-hand chamber 41 of the valve 22 is supplied with the oil pressure of the circuit 34. The sleeve 39 pushes the valve member 22a to the left through the coil spring 40 by virtue of the oil pressure in chamber 41. When the throttle pressure Pth has reached a prescribed value, the sleeve 39 comes into contact at the end 39a thereof with the valve body end 46 to prevent the oil pressure above the prescribed value from acting upon the valve member 22a. Thus the rightward or leftward movement of valve members 22a is controlled by the oil pressure acting in the left-hand chamber 36 and by both of the force of the right-hand coil spring 37 and the oil pressure acting in the chamber 41 which is transmitted to valve member 22a by the force of the coil spring 40.

Figure 3:
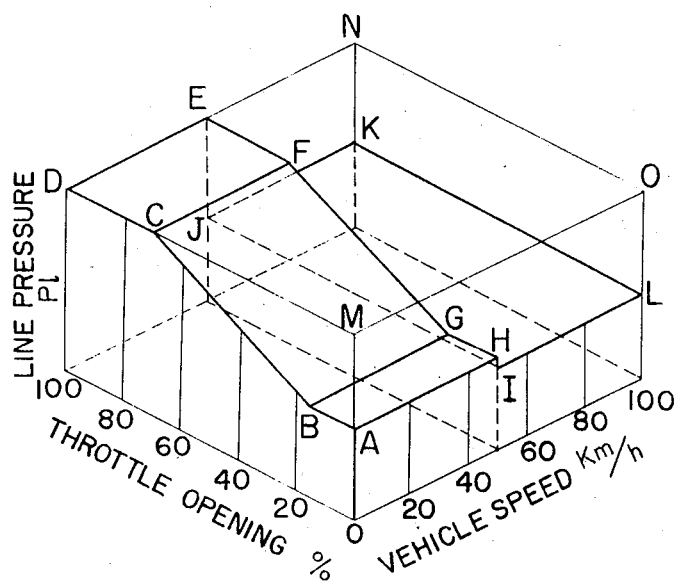
FIG. 3 shows the characteristics of the controlled oil pressure obtained by the oil pressure control circuit as illustrated in FIG. 2.

The control device of the invention operates as follows: When the vehicle speed is low and the valve member 31a of the changeover valve 31 is shifted to the left, the throttle pressure is furnished to the circuit 34. The throttle pressure Pth is therefore supplied to the right-hand chamber 41 of the pressure control valve 22, and together with the force of the coil spring 37, pushes the valve member 22a to the left. In the left-hand chamber 36 of valve 22 a pressure (called the line pressure $pl$) is built up in accordance with the pressure in the right-hand chamber 41. Further, with an increase in the throttle opening, the throttle pressure Pth in chamber 41 increases until the sleeve 39 is in contact with the valve body end 46. In this state, the force pushing the valve member 22a leftward will not increase even if the throttle pressure Pth increases further, since the spring 40 which exerts the force on valve member 22a is at maximum compression. Therefore, as shown in FIG. 3, above the value A, B, G and H (the throttle lever free travel range $l$), the line pressure $pl$ furnished from the circuit 21 to the clutch and brakes increases with an increase in the throttle opening, when the vehicle speed is low (in FIG. 3, 50 km./h. or less); but at a selected throttle opening (in FIG. 3, approximately 70 percent), the line pressure becomes a constant value, as shown by C, D, E and F.

With the increase of the vehicle speed, the governor Pressure Pgo from the governor 15 increases to move the valve member 31a of the changeover valve 31 rightward, thereby connecting the circuit 33 to the circuit 35 and blocking the throttle pressure Pth circuit 27. Thus the pressure in the chamber 41 of the pressure control valve 22 is discharged to the oil passageway 24a of manual valve 24 via the circuits 34, 33 and 35. Therefore, the oil pressure in the left-hand chamber 36 of the pressure control valve 22 is controlled by means of the coil springs 37 and 40 on the right side of the valve, so as to be maintained at a low pressure irrespective of the throttle pressure Pth, which is furnished as the line pressure $pl$ through the circuit 21. This state is shown by I, J, K and L, which is the highest of the vehicle speeds in the oil pressure characteristics diagram of FIG. 3.

When the manual valve 24 is in L position (low range), the pressure discharge circuit 35 of the pressure control valve 22 is connected to the circuit 42 to which the line pressure $pl$ is being furnished, the line pressure $pl$ is supplied to the right-hand chamber 41 of the pressure control valve 22 via the circuits 42, 35 and 34 to force the sleeve 39 fully toward the valve body end 46. Consequently, the valve member 22a of the pressure control valve 22 is pushed to the left by the force of the coil springs 40 and 37 and the oil pressure in the left-hand chamber 36 becomes a steady high oil pressure in accordance with the combined force of these two springs. This high line pressure $pl$ is furnished as the servo pressure of the brake from the circuit 21. With the manual valve 24 in L position, the right- and left-hand chambers 41 and 36 of the pressure control valve 22 are open to each other regardless of the position of the changeover valve member 31a as described above. Therefore, the oil pressure $pl$ is obtainable irrespective of the vehicle speed or the throttle opening and the controlling oil pressure M, D, N and O indicated by chain line is provided.

Between the circuit 34 and the circuits 33 and 35 is provided a check ball device 43 having a ball 44 inside. When the throttle pressure Pth is supplied from the circuit 33 to the circuit 34, the ball 44 is moved to the right to block the circuit 35. When furnishing the line pressure $pl$ from the circuit 35 to the circuit 34, the ball is moved to the left to block the circuit 33.

What is claimed is:

1. In a fluid-type automatic transmission comprising a vehicle speed-changing device having oil pressure servo means for controlling the speed and a throttle valve, the improvement comprising a pressure source, a pressure control valve for controlling the pressure in the servo means, the pressure control valve comprising a valve body, a valve member movable within a valve body in response to the degree of opening of the throttle valve, spring means cooperable with the valve member to normally urge it in one direction, a sleeve within the valve body, a resilient member cooperable with the sleeve and the valve member to limit the movement of the valve member within the valve body, the sleeve and coacting resilient means acting to limit movement of the valve member and to maintain a constant pressure when the throttle pressure is in excess of a predetermined amount.

2. In a fluid-type automatic transmission having oil pressure servo means for controlling clutch and brake means, a throttle valve, and a manually operable valve in communication with the servo means and the throttle valve, a pressure source, a pressure control valve for controlling the pressure acting on the servo means, the pressure control valve comprising a valve body, a valve member movable within the valve body, spring means cooperable with the valve member to normally urge it in one direction, a first chamber toward that end of the valve member toward which the valve member is urged by said spring means, a second chamber toward the opposite end of the valve member, a sleeve member cooperable with the valve member on the side adjacent the second chamber, and a compression spring intermediate the valve member and the sleeve, the first chamber being in communication with the throttle valve, and the second chamber being in communication with the manually operable valve.

3. In a fluid-type automatic transmission according to claim 2 including a governor and a changeover valve, wherein the governor is in communication with the changeover valve and the changeover valve is in communication with said second chamber.

4. In a fluid-type automatic transmission according to claim 3 including a check valve in the line between the changeover valve and said second chamber.

* * * * *